June 5, 1956  D. POLLAN ET AL  2,748,653
REMOTE CONTROL SLIDE PROJECTOR
Filed May 29, 1952  8 Sheets-Sheet 2
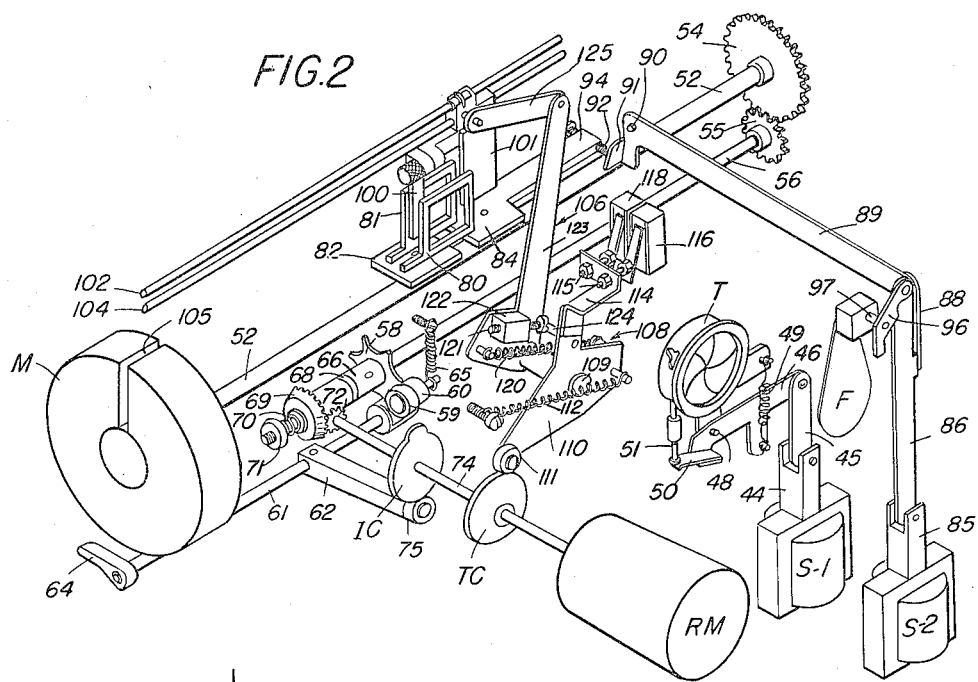
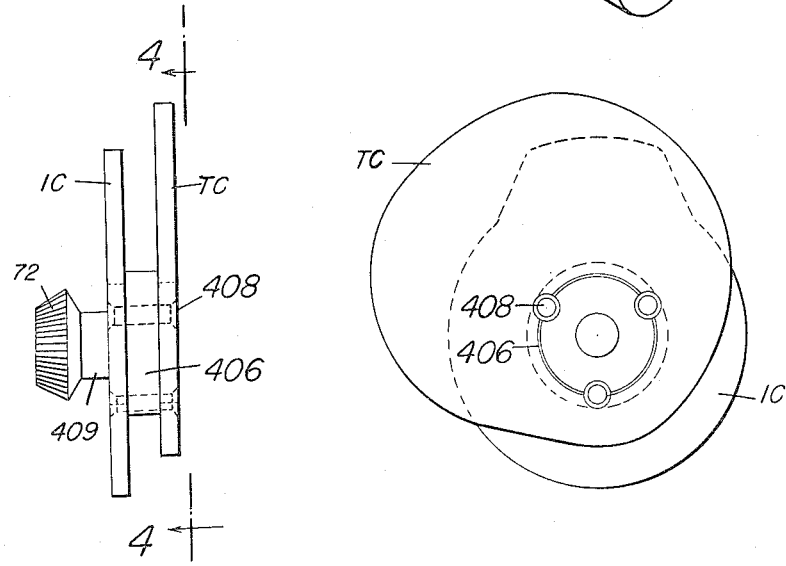
INVENTORS
David Pollan
John Halahan
Floyd A. Lyon
Theodore F. Aronson
By Williams, Rich & Morse
Attorneys

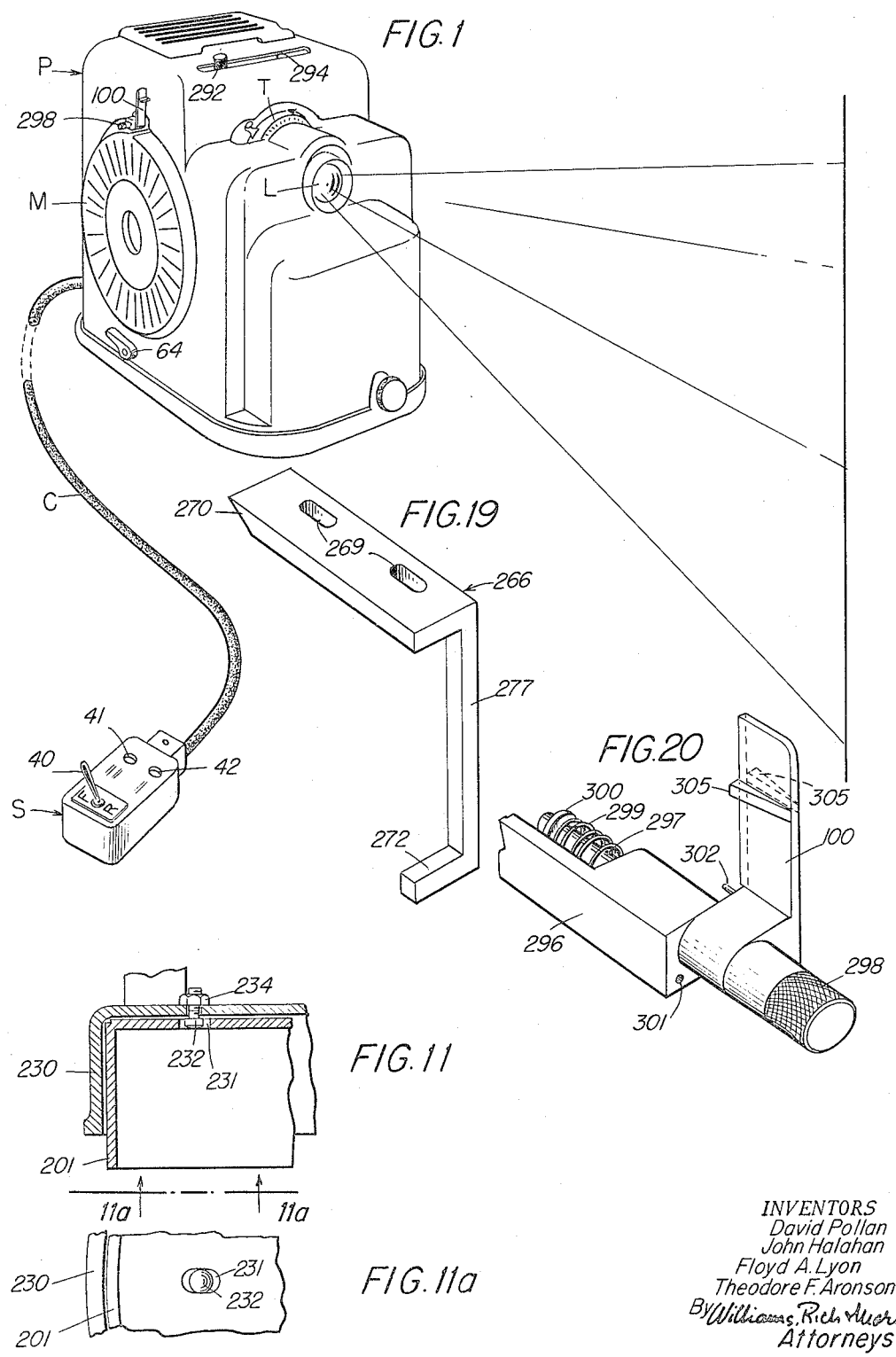

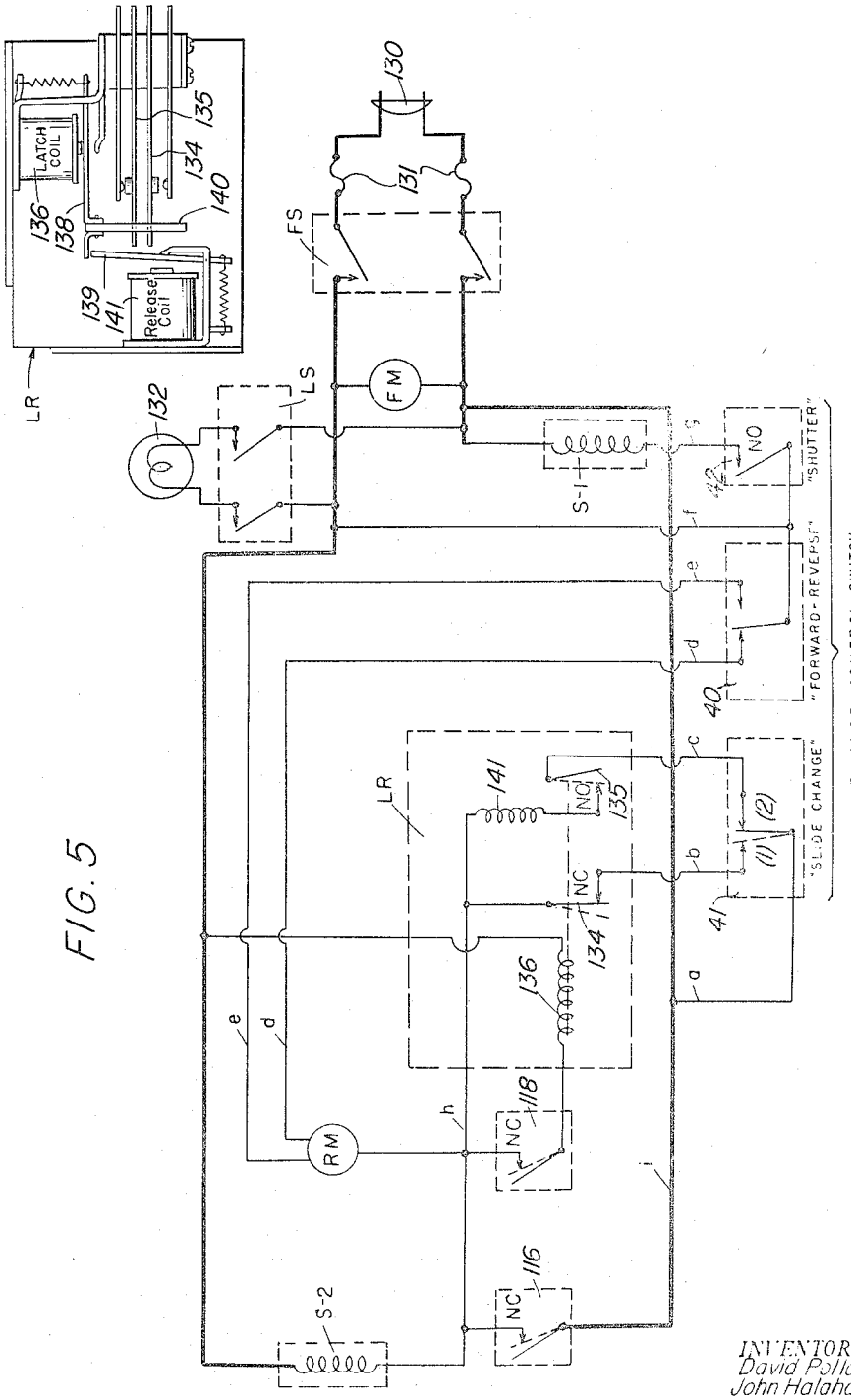

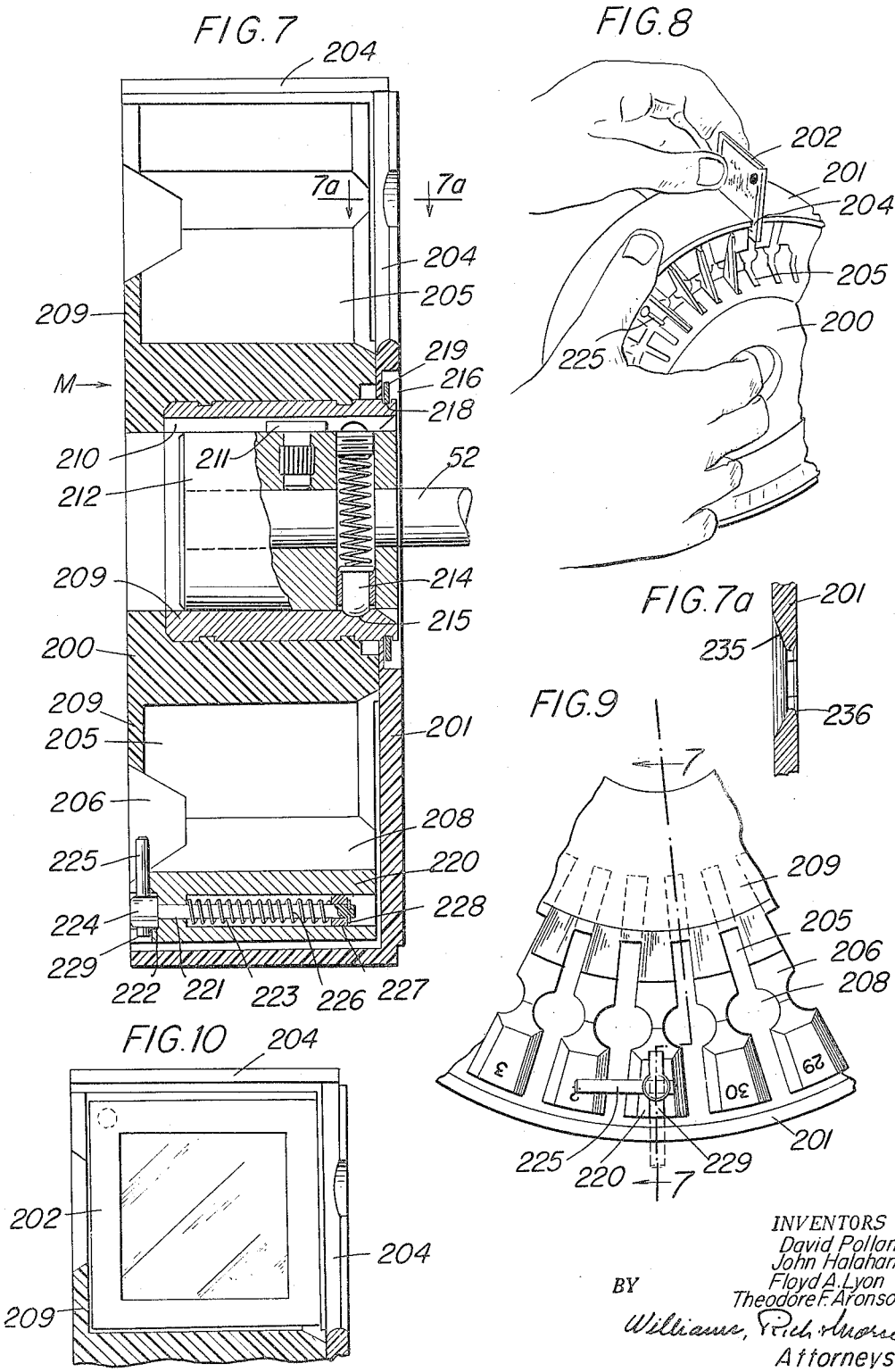

June 5, 1956 D. POLLAN ET AL 2,748,653
REMOTE CONTROL SLIDE PROJECTOR
Filed May 29, 1952 8 Sheets-Sheet 5
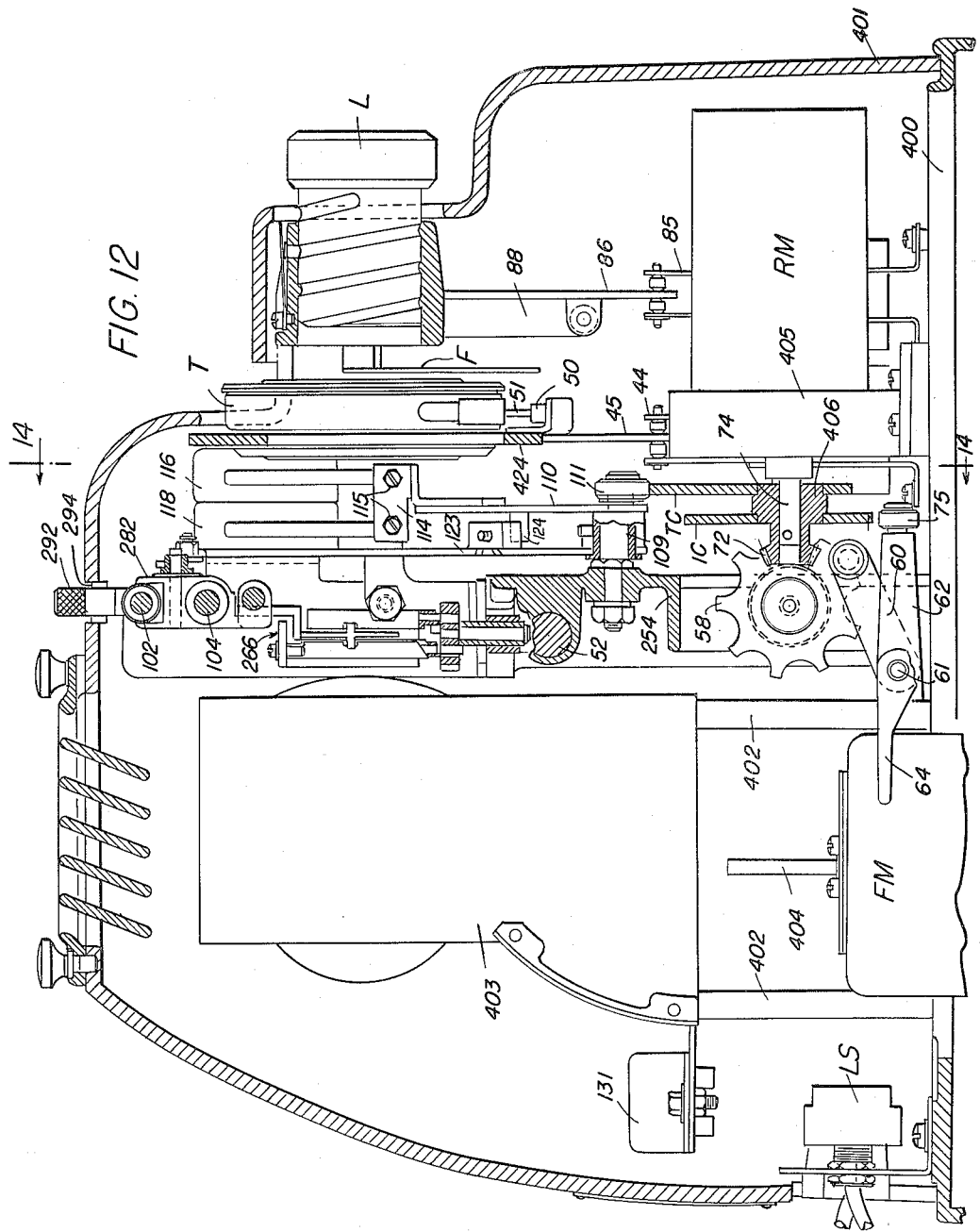
INVENTORS
David Pollan
John Halahan
Floyd A. Lyon
Theodore F. Aronson
By Williams, Rich & Morse
Attorneys

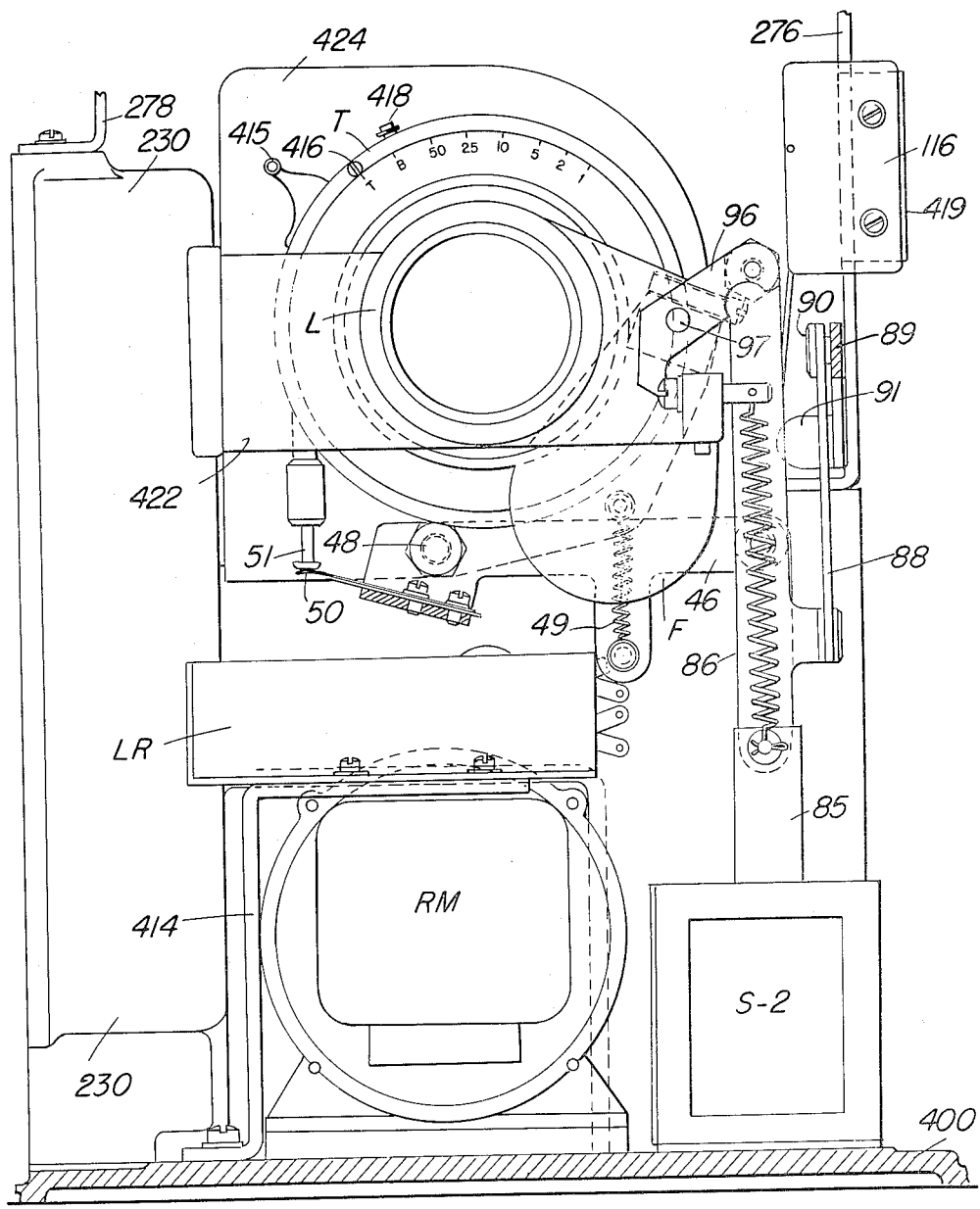

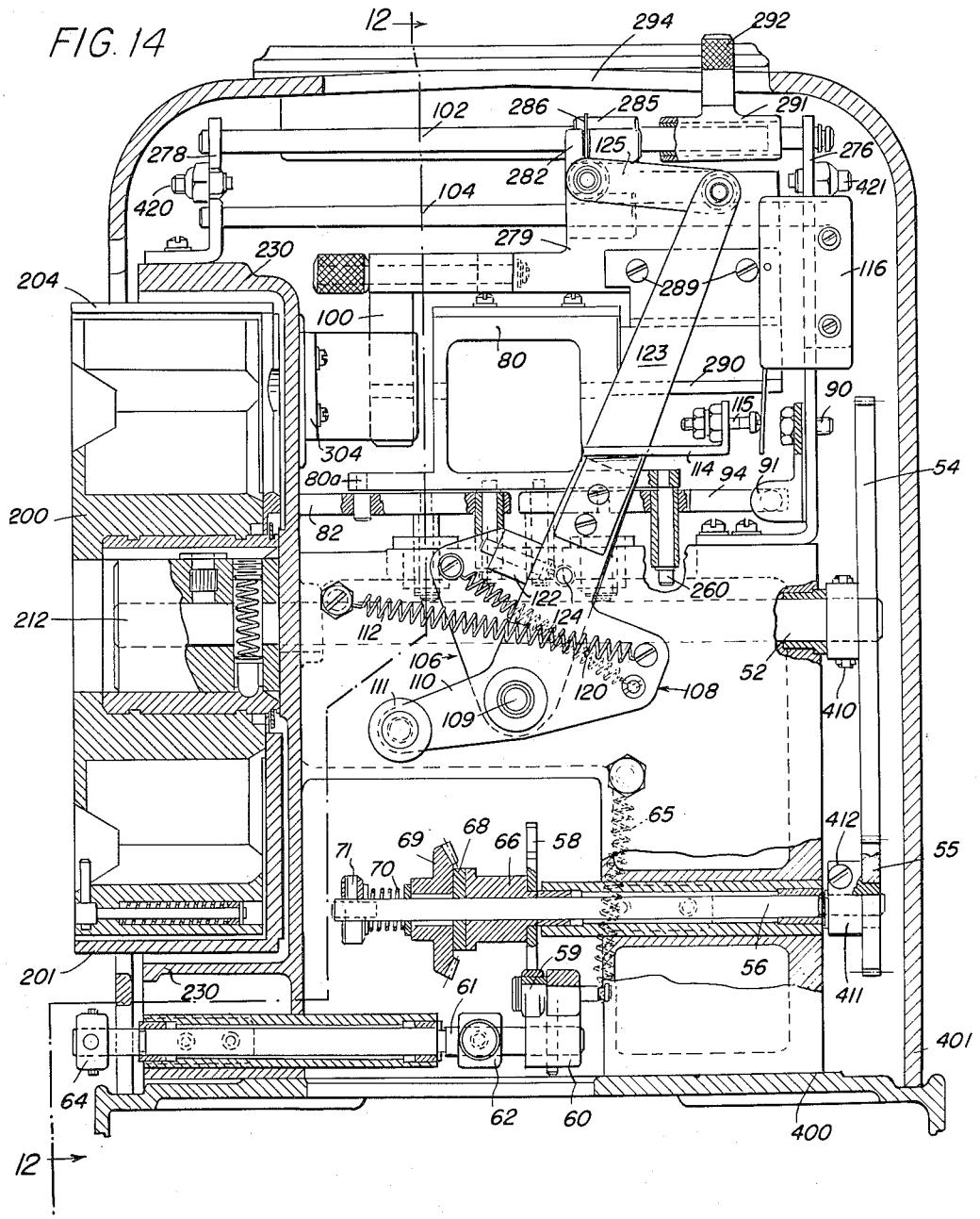

June 5, 1956
D. POLLAN ET AL
2,748,653
REMOTE CONTROL SLIDE PROJECTOR
Filed May 29, 1952
8 Sheets-Sheet 8
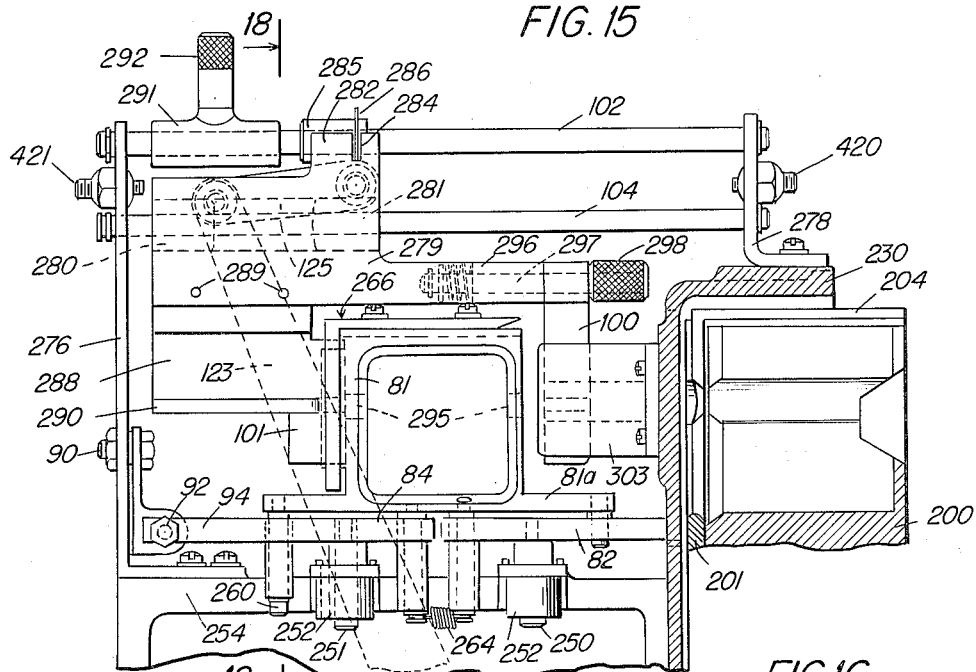
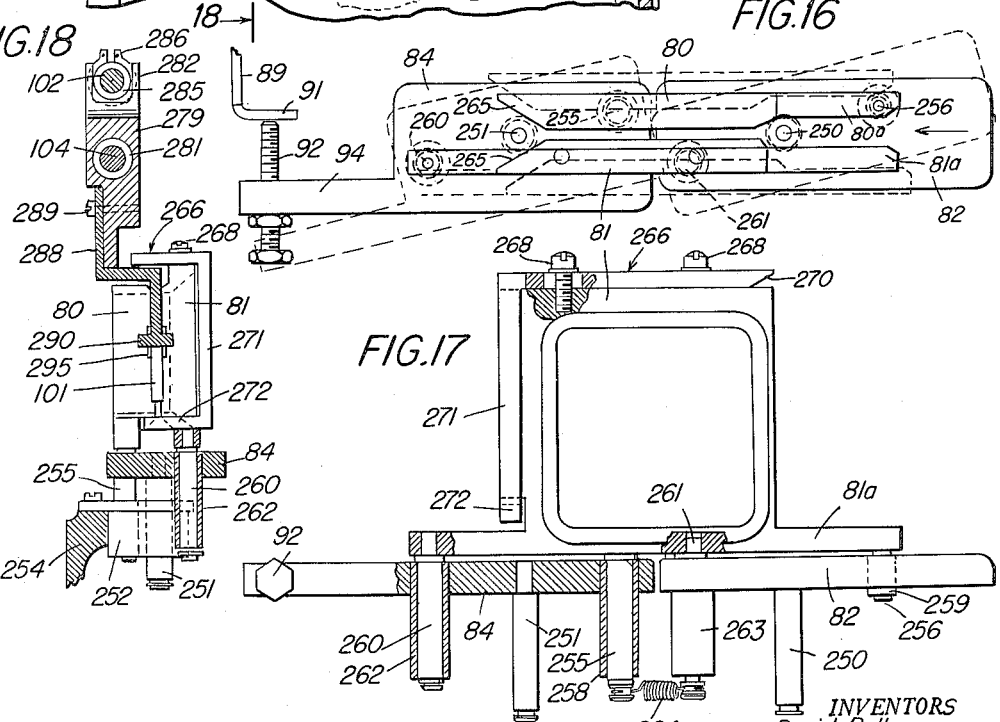
INVENTORS
David Pollan
John Halahan
Floyd A. Lyon
Theodore F. Aronson
By Williams, Rich & Morse
Attorneys

United States Patent Office 2,748,653
Patented June 5, 1956

2,748,653

REMOTE CONTROL SLIDE PROJECTOR

David Pollan, Jackson Heights, John Halahan and Floyd A. Lyon, Brookville, and Theodore F. Aronson, Valley Stream, N. Y., assignors to Viewlex, Inc., Queens County, N. Y., a corporation of New York Application May 29, 1952, Serial No. 290,756

11 Claims. (Cl. 88—27)

This invention relates to slide projectors and more particularly to an electrically operated projector for a sequence of slides adapted for either remote control or automatic operation.

Objects

The general object of the invention is to provide a motor driven, electrically actuated projector for a plurality of slides which can be operated from a remote point, for example by a lecturer at a position near the projection screen who has merely to manipulate switches. If mechanical means are substituted for the operator to manipulate the switches the projector may be made fully automatic.

Other related objects are:

(a) To provide an improved slide magazine;

(b) To provide improved indexing means for progressively moving the magazine step by step and in either direction;

(c) To provide a projector adapted for the rapid interchanging of magazines pre-loaded with slides;

(d) To provide an improved slide positioning mechanism adapted to position slides having mounts of various thicknesses with the transparency to be projected always in the same plane;

(e) To provide a projector in which slides are taken from a magazine for projection and returned to the same magazine after projection;

(f) To provide resiliently coupled slide actuating mechanism capable of yielding should a slide become jammed to prevent injury to the slide or damage to the mechanism;

(g) To provide automatically actuated means for intercepting the light beam during the changing of slides and the same combined with means for releasing the means which holds the slide in projection position; and (h) To provide an electrical control circuit adapted to produce, after a single actuation of a switch, a single complete cycle of operations independently of subsequent actuation of said switch before the cycle is completed.

Other objects and advantages will in part appear and in part will be obvious from the following detailed description of the present preferred embodiment of the invention, taken in conjunction with the drawings in which:

Fig. 1 is a perspective view of the complete projection unit including the projector, its remote control and the connecting cable;

Fig. 2 is a three-dimensional diagram of the principal parts of the mechanism showing their operative relationship;

Fig. 3 is a side elevation of the cam and drive pinion unit;

Fig. 4 is a front elevation taken on the line 4—4 of Fig. 3;

Fig. 5 is a schematic diagram of the electrical control circuit;

Fig. 6 is a plan view of the latch relay incorporated therein;

Fig. 7 is a central vertical elevation through the slide magazine unit and the hub of the indexing shaft on which it is mounted in use;

Fig. 7a is a section through the magazine shell taken on the line 7a—7a of Fig. 7;

Fig. 8 is a broken perspective view of the slide magazine showing the manner of inserting slides therein;

Fig. 9 is a side elevation of a lower segment of the magazine unit showing the stop pin in partially unlocked position;

Fig. 10 is a sectional elevation of the upper portion of the magazine unit as shown in Fig. 7 with a slide in place therein;

Fig. 11 is a fragmentary horizontal section through the magazine shell and a portion of the projector frame showing the magazine shell locating pin;

Fig. 11a is a fragmentary elevation on the line 11a—11a of Fig. 11;

Fig. 12 is a side elevation of the projector taken approximately on the line 12—12 of Fig. 14 with some parts shown in section;

Fig. 13 is a front elevation of the projector with the housing removed and certain parts omitted;

Fig. 14 is a front sectional elevation taken approximately on the line 14—14 of Fig. 12 with certain parts omitted;

Fig. 15 is a detailed rear elevation of part of the slide changing mechanism and the pressure frame assembly including a portion of the slide magazine;

Fig. 16 is a plan of the pressure frame assembly with its guide and stop member removed;

Fig. 17 is an enlarged rear elevation of the pressure frame assembly corresponding to Fig. 16, some parts being shown in section;

Fig. 18 is a sectional elevation taken on the line 18—18 of Fig. 15;

Fig. 19 is a perspective view of the guide and stop member which is attached to the rear pressure frame; and Fig. 20 is a perspective detail of the slide pusher and associated parts.

General description of mechanism

Fig. 1 shows the complete projection unit comprising the projector P connected by a cable C with a remote control switch S. The main visible elements of the housed projector are the lens L, the shutter T and the removable magazine M containing radially arranged slides. A number of magazines may be provided and when the slides in one have all been projected, it may be quickly replaced by another loaded magazine. The remote control unit S contains three switches, namely, a toggle switch 40 which is the "forward-reverse" switch controlling the direction of movement of the magazine M, a push button switch 41 which controls the slide-changing mechanism, and a push button switch 42 which controls the shutter. By means of unit S the operator can:

(1) actuate the shutter T, of known type, which may be pre-set on "time," "bulb" or any desired exposure from 1 second to various fractions of a second, to project, as often and for as long as may be desired, the slide then in position for projection;

(2) actuate slide changing mechanism which, once set in operation, completes a slide changing cycle and stops until the slide change switch is released and again actuated; and (3) control the step by step indexing of the slide magazine in a "forward" or "reverse" direction so that, if desired, slides already projected may be projected again.

The prime movers for the projector mechanism are a reversible motor geared down to 60 R. P. M. and two solenoids. The motor, when energized, drives a cam shaft and, through a slip clutch, a magazine indexing shaft, one solenoid actuates shutter T and the other solenoid actuates a flag which intercepts the light beam during the changing of slides and opens and closes the pressure frames which grip and position the slides for projection. The motor and the two solenoids are under the control of various manual and automatically operated switches.

The principal elements of the mechanism and their operation will best be understood from a consideration of the three-dimensional diagram of Fig. 2 followed by a description of the electrical controls in connection with Figs. 5 and 6. Following these descriptions, the actual preferred construction will be described.

Referring to Fig. 2, shutter T is tripped by energizing solenoid S-1, its plunger 44 acting through link 45 on lever 46 which is pivoted at 48 and supported by spring 49. Leaf spring 50 pushes up on pin 51.

Slide magazine M is mounted on the end of an indexing shaft 52 having a large driven gear 54 meshing with a small drive gear 55 fixed on the end of detent shaft 56. Inwardly of this shaft is detent 58, a star-shaped disc with nine grooves which are engaged by roller 59 on detent arm 60. The detent arm is fixed on shaft 61 on which are also fixed kick-off arm 62 and manual release arm 64. The detent arm is held against the detent by a tension spring 65. The detent 58 is friction coupled, through a slip clutch comprising its hub 66 and a friction washer 68, to a driven bevel gear 69 which is pressed toward said washer by a compression spring 70 tensioned by collar 71 threaded on the end of shaft 56. Gear 69 is driven by pinion 72 on cam shaft 74 which is driven by the reversible motor RM. Assuming the motor and shaft 74 to be rotating, detent 58 and shaft 56 will rotate only when detent arm 60 is disengaged from the detent. Such disengagement is effected when the high point of indexing cam IC, on shaft 74, engages the roller 75 on the end of arm 62. This occurs once during each slide changing cycle, the detent being released long enough to permit the detent to move from one sprocket to the next, thus moving the magazine by the distance separating two adjacent slides, as determined by the ratio between gears 54 and 55, which in the embodiment shown is 10:3.

Slides are positioned for projection between front and rear pressure frames 80 and 81, each of which is pivotally attached to two separate pivoted mounting plates 82 and 84, forming a parallel motion linkage. As described later, a spring tends to draw these frames together.

Solenoid S-2 performs two functions. When energized, it draws down its plunger 85 and, through links 86 and 88, rocks lever 89 on its pivot 90, causing tongue 91 to press rearwardly on set-screw 92 in the arm 94 of plate 84, which rotates plates 82 and 84 on their pivots to separate the pressure frames 80 and 81. Secondly, it acts through links 86 and 96 to rotate shaft 97 of a flag F, raising it into line with shutter T and blocking the light beam, so no light can pass during slide changing. Shaft 97 is rotatably supported in a fixed frame member which may be part of the lens mounting bracket, the flag moving between shuter T and lens L (not shown in Fig. 2, see Fig. 12).

Slides are transported from magazine M to a position between the pressure frames 80 and 81 and returned to the magazine by a pair of members which engage each slide by its side edges, namely a pusher 100 and a slider 101. The pusher is attached to the slider and the slider is mounted on a pair of parallel rods 102, 104 so as to travel in a plane passing between the pressure frames and through a slot, here designated generally as 105, in the magazine unit M. (In other figures this slot is shown as consisting of slots 204 and 205.)

Motion is imparted to the slider from transfer cam TC on the shaft 74 through the medium of a "link and block assembly" generally designated 106 and an "arm and hub assembly" generally designated 108 which are yieldably interconnected to prevent damage to the mechanism in case of a jam. Said assemblies are separately pivotally mounted on a stub shaft 109 fixedly supported from a main frame member.

The "arm and hub assembly" 108 comprises a cam-following arm 110 having a roller 111 which is caused to bear on cam TC by spring 112. Attached to arm 110 is a bracket 114 carrying a pair of set screws 115 which actuate a pair of microswitches 116 and 118, the function of which will be described later.

The "link and block assembly" 106 pivots about shaft 109 and is resiliently coupled to the arm and hub assembly by spring 120 and an adjustable screw 121 in block 122, fixed on link 123, which screw bears against pin 124 extending from arm 110. When arm 110 is driven counterclockwise, as seen in Fig. 2, it drives link and block assembly 106 in the same direction. However, such movement is produced only by spring 112, which causes arm 110 to follow cam TC, and a jam can cause no damage. As arm 110 moves clockwise it draws assembly 106 with it through coupling spring 120 and if link and block assembly 106 is stopped by an obstruction, cam TC can continue to revolve since spring 120 will stretch. Link 123 is pivotally coupled through link 125 with slider 101 whereby the motion of transfer cam TC causes the slider to move back and forth on rods 102, 104. When cam TC is at its high point the slide is in projection position and when at its low point the slide is in the magazine M. While the slide is moving into or out of the pressure frames they are held apart by energization of solenoid S-2.

Electrical controls

With the foregoing description of the basic structure in mind the electrical control system will now be described with reference to Figs. 5 and 6.

The electrical controls are in two general categories, external manually operated and internal automatic. In the first category, and not part of the invention, are the fan switch FS, which controls the current supply flowing from plug 130 through fuses 131 to cooling fan motor FM, and lamp switch LS controlling the parallel circuit to the projection lamp 132. The fan switch acts as a master switch for the unit, operation being impossible unless the fan is running. The other external control, which is part of the invention, is the remote control switch unit S (Fig. 1) the components of which are the three switches 40, 41, 42 at the bottom of Fig. 5. The seven wires, a, b, c, d, e, f, g connected to these switches are in cable C (Fig. 1). The designations "NO" and "NC" on switches are the usual type designations meaning, respectively, normally open and normally closed. In the second category (internal controls) there are the solenoids S-1 and S-2, the two microswitches 116 and 118 and a latch relay LR containing two movable switch arms 134 and 135, one possible structure of which is shown in Fig. 6.

The above controls operate as follows:

When the operator depresses the shutter switch 42 it energizes solenoid S-1, one side of which is permanently connected to the line, by connecting the other side to the line through wires g and f. The shutter is thus actuated. A standard shutter may be used which is pre-set on "time," "bulb" or some self-timing opening. The switch will be pressed twice to open and close the shutter if it is set on "time." If on "bulb" the switch will be held closed to keep the shutter open. If on some other setting, pressing the switch will cause an exposure of predetermined duration with automatic closing of the shutter. Such brief exposures may be used for training in rapid identification of the subject matter of the slide, for example in training armed forces in the identification of friendly and enemy aircraft, ships etc.

The forward-reverse toggle switch 40 controls the direction of reversible motor RM which consists essentially of two independent motor units having a common shaft. The windings of the two units are arranged to produce rotation in opposite directions. Switch 40 selectively energizes one or the other of the units to which, respectively, the wires d and e are connected. This controls the direction of the slide magazine movement but has no effect on other operations because it makes no difference which way the cams IC and TC rotate.

Slide change switch 41 is electrically interconnected with the latch relay LR and the microswitches 116 and 118, which are under the control of the slide changing mechanism, and the circuit is so designed that when the slide change switch button is pressed one complete cycle of slide changing operations takes place and the mechanism then stops, whether the button is pressed momentarily or held down. If held down, it must be released and pressed again to repeat the cycle. It will be noted that switch 41 is single throw double pole. Its two positions are designated (1) and (2). Normally it is in position (2). When depressed to position (1), current flows through wires $a$ and $b$ and switch arm 134 to energize motor RM and solenoid S–2 through wire $h$. This raises flag F into the optical path and opens the slide frames 80, 81. When the motor starts, the cam follower 111 is at the high point of cam TC and normally closed microswitches 116, 118 are being held open. As cam TC rotates, however, switch 116 is released, closes and connects wire $h$ directly to the line through wire $i$, shunting the slide change switch 41 and maintaining RM and S–2 energized regardless of the position of switch 41. Rotation of cam TC also releases microswitch 118 which closes and energizes latch coil 136, throwing switch arms 134 and 135 into the dotted line positions of Fig. 5. (These are the positions shown in Fig. 6.) When armature 138 is pulled up by latch coil 136 it is locked in this position by latch armature 139. (Arms 134 and 135 are moved by an insulating block 140 carried by armature 138.) Slide change switch 41, position (1), is thus disconnected from wire $h$ by the opening of switch 134 and it cannot again act to energize the motor, even after microswitch 116 has been opened by completion of the slide changing cycle, until it has been returned to position (2) which will energize release coil 141 through switch arm 135 and unlatch the relay, returning its contact arms into the solid line positions. This portion of the circuit will then have returned to its original condition. Upon depressing switch 41 again the cycle will be repeated.

*Slide magazine*

The complete magazine unit M comprises a magazine assembly, a mounting shell and a stop pin assembly which will now be described with reference to Figs. 7, 7a, 8, 9, 10 and 11.

Referring to Fig. 8, the magazine 200 is mounted in shell 201 and a slide 202 is shown being inserted through the slot 204 in the shell into a slot 205 in the magazine which is a drum having thirty radial slots each accommodating a single slide which may be molded in one piece of synthetic resin or the like. The face of the magazine has an annular groove 206 with sloping sides to expose a portion of each slide so it can be grasped for removal. Each slot has a central cylindrical enlargement 208 to allow the free passage of pusher 100 of the slide changing mechanism. The front wall 209 of the magazine extends across the bottom of each slot to retain the slides 202 in the position shown in Fig. 10. Molded into the wall of the center opening of the magazine as an insert is a metal bushing 209 having a keyway 210 to receive key 211 on a hub 212 fixed on indexing shaft 52, which hub also carries a spring-pressed detent 214 which snaps into a retaining groove 215 in the bushing.

Magazine 200 is rotatably attached to shell 201 by the extension of bushing 209 through a central opening in the shell which is surrounded by a recess 216. The bushing has a groove 218 into which a flat retaining ring 219 is snapped, bearing against the bottom of recess 216. To prevent rotation between the magazine and shell, for the purpose of retaining slides in place during handling, the magazine is provided with a stop pin assembly mounted in the outer end of the radial partition 220 in which there is a bore 221, a front counterbore 222 and a rear counterbore 223. A headed pin 224 having a cross-bar 225 extends through said bore and is retracted by spring 226 which bears on a collar 227 held in place by a retainer 228. The cross-bar 225 drops into a radial slot 229 when in alignment therewith, when turned inwardly as in Fig. 7 or outwardly as shown in dotted lines in Fig. 9. When slot 229 is lined up with slot 204 in shell 201 and the cross-bar locked in the outwardly turned position, it engages with slot 204 to lock the magazine against rotation in the shell, at which time slot 204 is blocked by partition 220 and all of the slides in the magazine will be secured.

The magazine unit, when positioned on hub 212, as shown in Fig. 7, is housed within a pan-shaped vertically positioned side portion 230 of a casting which constitutes the main frame of the machine (see Figs. 13 and 14). In operation, the magazine 200 is rotated step by step, or indexed, while the shell 201 is held stationary with its slot 204 in alignment with the slide transporting mechanism. To so hold the shell it is provided with an opening 231 (Figs. 11, 11a) in its back which fits over a locating pin 232 secured to the inner face of portion 230 by a nut 234.

To install the magazine, hub 212 is rotated to place key 211 at the top, the magazine unit is pushed onto the hub with keyway 210 and the slot 204 of shell 201 also at the top, pin 225 is pulled out of slot 204 and turned inwardly, whereupon shell 201 can be rotated slightly to align hole 231 with locating pin 232 and the magazine unit pushed in until detent 214 engages groove 215. The magazine is then ready for operation and in this position the slots 205 in the magazine will be caused to align themselves, by the indexing mechanism, in the plane in which the pusher 100 and slider 101 of the slide changing mechanism reciprocate.

Referring to Fig. 7a, the walls of shell 201 adjacent slot 204 are beveled on the inside at 235 and outside at 236 as shown.

*Pressure frame assembly*

Slides are taken from the magazine, just described, by the transporting mechanism and placed between a pair of pressure frames which accurately position each slide, regardless of its thickness, in the proper plane for projection. Slides consist of a transparency, usually of film, and supporting mounts of various kinds. The mount may be of cardboard but preferably is of the type comprising a pair of cover glasses bound together around the edges. Slides, of course, may be made with an emulsion on the inner face of one glass. A focusing problem results from the fact that slides may have cover glasses and bindings of different thicknesses and, furthermore, cardboard mounts usually differ greatly in thickness from glass mounts. The practice heretofore has been to press the slide against a fixed gate with the result that the transparency is positioned in different planes according to the thickness of the mount, necessitating refocusing of the projection lens. To eliminate this difficulty and to make possible the use of slides of mixed types and varying thicknesses without refocusing, the invention provides a slide grate which positions slides of all thicknesses with their transparencies in the same plane. (It is assumed that the mounting extends equally on both sides of the transparency.) This is accomplished by a pair of pressure frames mounted as parts of a parallel motion linkage so that each frame moves toward and away from the desired plane of the transparency at the same rate and clamps it in the same position regardless of the thickness of the mount. The mechanism by which this is done is shown in Figs. 14, 15, 16 and 17. Fig. 14 is a front view and Figs. 15 and 17 are rear views. Front in the plan of Fig 16 is toward the top.

The front pressure frame 80 and rear pressure frame 81 are each pivotally mounted on each of pivoted plates 82 and 84. Plate 82 has a fixed pivot leg 250 and plate 84 has a similar leg 251 and these are rotatably supported in mountings 252 secured to the main bracket casting 254. Frame 80 has two downwardly extending pins 255 and 256 rotating in bushings 258 and 259 secured in plates 84 and 82 respectively. This supports frame 80 in upright position. Frame 81 is similarly supported by pins 260 and 261 revolving in bushings 262 and 264. The lower ends of the nearest pins on opposite frames, namely pins 255 and 261 are coupled by a spring 264 which draws the frames together. Pivots 260, 251 and 255 are on a diagonal line across plate 84 and the section of this plate in Fig. 17 is taken on this line. Pivots 261, 250 and 256 are on a parallel diagonal line across plate 82. When tongue 91 of lever 89 presses on screw 92 it moves plates 82 and 84 and frames 80 and 82 into the dotted line positions of Fig. 16, opening the frames to receive or discharge a slide. Frames 80 and 82 have their bases 80a and 81a extended in the direction of magazine 200 and outwardly beveled at the ends to guide the bottom edge of a slide moving across plate 82 into the space between the frames. The vertical faces of the frames at their other ends are beveled outwardly at 265 for a purpose to be described later.

Frame 81 is slightly higher than frame 80 and has a guide and stop member 266 (see Fig. 19) attached to its top by screws 268. Its position is longtitudinally adjustable by reason of elongated slots 269, its forward edge 270 is beveled to push slides down, and it has a depending leg 271 with an inwardly turned end 272 which limits the inward movement of slides. The under side of its top surface acts as a top guide for slides.

Reverting to Fig. 2, in conjunction with the figures just described, it will be seen that when solenoid S–2 is energized and actuates lever 89 the pressure frames are opened. At this point a slide is moved between the frames in the direction of the arrow in Fig. 16. When the slide reaches end 272 of guide 266 it is in position for projection. On deenergization of the solenoid the frames approach the slide from opposite sides under the influence of spring 264 and locate the transparency at the focal plane regardless of the thickness of the slide.

*Slide changing mechanism*

Cooperating with the magazine unit and the pressure frame assembly above described is slide changing mechanism the operation of which was generally described above with reference to the diagram, Fig. 2. Referring to Figs. 14, 15, 18 and 20, its actual construction will now be described.

Above the pressure frames 80, 81 the horizontal rods 102, 104 are supported in brackets 276, 278 bolted to main bracket 254 and the portion 230 thereof which receives magazine 200. Slidably mounted on said rods is a block 279 having a bore containing two bushings 280, 281 fitting the lower rod. The top of block 279 has a forked portion 282 having a transverse slot 284. Bushing 285 on upper rod 102 rests in the fork and is held therein by retaining ring 286 which coacts with slot 284 to lock bushing 285 in place.

Slider 101 extends upwardly with an integral wider web portion 288 which turns twice at right angles to clear stop 266 and is attached to the front face of block 279 by screws 289. On said web portion is an integral rib 290. Also slidably mounted on rod 102 is a sleeve 291 having a knob 292 which extends through a slot 294 in the housing (Figs. 1, 14 and 12). By means of knob 292 one can manually actuate the slide changing mechanism, pushing it toward the magazine against the tension of spring 120 which returns it. When this is done rib 290 enters between the beveled faces 265 of the pressure frames and separates them. The opposed faces of the frames are notched at 295 to receive the rib. This wedging of frames 80, 81 apart during manual operation is desirable because the solenoid S–2 which normally opens the frames is not energized and the slide should move freely. Also, if the automatic opening mechanism should get out of adjustment, the rib 290 will nevertheless open the frames before the slide is engaged by the slider 101. In fact the solenoid opening operation may be dispensed with but is preferable because it relieves the load on the motor and the solenoid is present anyway for actuation of the flag F.

Block 279, which slides on the horizontal rods, has a horizontally-extending arm 296 on which the pusher 100 is mounted in the manner best shown in Fig. 20. The pusher is fixed to a rod 297 which has a knob 298 and which is surrounded by a spring 299 held under compression between a washer 300 and arm 296 so that rod 297 is slidable longitudinally in arm 296, the pusher 100 being drawn against the end of the arm in which there is a hole 301. A pin 302 is mounted in the pusher for engagement with the hole when the pusher is in a downwardly extending, vertical position. Thus by drawing out on knob 298 the pusher can be rotated.

Before the magazine 200 is inserted in the projector, the slide changing mechanism is moved by means of knob 292 into the path of the magazine and pusher 100 is turned vertically, as shown in Figs. 1 and 20, in which position it engages the housing of the projector and prevents return of the slide changing mechanism. The magazine is then inserted with its slot 204 properly aligned by means of locating pin 232 (Fig. 11), the pusher 100 is turned into its operating position and when released it will take a slide from the magazine and move it into projecting position between the pressure frames 80 and 81.

The bottom of the slide will be guided between the pressure frame extensions 80a and 81a. To guide the upper part of the slide, a pair of guide members 303 and 304 are attached to the main bracket casting 254 so as to be disposed above extensions 80a and 81a in their open position.

As may be seen in Fig. 20, pusher 100 is provided on opposite sides with wedge-shaped ribs 305 so as to have a broader front to engage the edges of slides. These ribs pass through the cylindrical openings 208 in the magazine.

*Structural organization*

From the foregoing descriptions of the various subassemblies and their operational relationships and the electrical control circuit the total mechanism will be readily understood. Its organization in a practical unit of compact form may be seen in Figs. 12, 13 and 14 wherein the reference numbers previously used indicate the same parts. Parts not previously referred to will now be pointed out.

The entire device is mounted on a base 400 and enclosed in housing 401. Supported from the base on legs 402 surrounding fan motor FM is a conventional illuminating system 403 containing the lamp, reflector and condensing lenses etc. in alignment with the optical axis of lens L. (In Fig. 12 the fan blades, which are mounted on shaft 404, are omitted.)

The reversible motor RM is mounted beneath the lens L on the base 400 and is directly coupled to the reduction gear case 405 from which the shaft 74 extends. The cams IC and TC with drive pinion 72 are pinned to this shaft as a unit. Referring to Figs. 3 and 4, it will be seen that both cams are mounted on a hub 406 to which they are secured by three rivets 408. Pinion 72 is attached to a boss 409 on this hub.

Referring to Fig. 14, gear 54 is fixed on shaft 52 by a pin 410 and gear 55 has a split hub 411 with a clamping screw 412. By loosening this connection the relationship between magazine M and detent 58 can be adjusted, after which screw 412 is tightened. Thereafter the detent assures the proper alignment of the slots in the magazine with the slide changing mechanism.

Referring to Fig. 13, the latch relay LR is mounted over motor RM on an angle bracket 414 attached to base 400. The solenoids S-1 and S-2 are also mounted on the base, preferably with the interposition of rubber mounts to absorb shock. These relays are of the shaded pole type for use on alternating current. It will also be seen that shutter T has a manual release 415, an exposure setting pin 416 and a diaphragm or stop control arm 418, all of which are exposed through an opening in the housing, as may be seen in Fig. 1. The microswitches 116, 118 are mounted on an angularly extending portion 419 of bracket 276. This bracket and bracket 278 (Fig. 14) carry adjustable stops 420, 421 which limit the extreme positions of the sliding block 279. The projection lens L is mounted in a bracket 422 attached to portion 230 of the main frame 254. The shutter T is likewise mounted in a bracket 424 which is also supported from portion 230.

Operation

It is believed that from the above description the functioning of the apparatus will be clear. It may be useful, however, to explain briefly the manner in which the projector is put in operation.

Magazine M is first filled with slides and then locked in closed position in its shell 201 by means of the crossbar 225. The slide changing mechanism is then moved toward the magazine side of the projector as far as it will go by means of the knob 292 and pusher 100 is turned into its upward vertical position by means of knob 298, as seen in Fig. 1. The magazine is then inserted in the projector, unlocked and pusher 100 is drawn out past the outer face of the magazine and turned into its vertical downward position in which it enters a slot in the magazine. When released it carries the slide in the slot into the projector between the pressure frames 80 and 81, the slide stopping against leg 272 of member 266.

The shutter is set for the desired timing and the shutter diaphragm adjusted for the proper illumination and the lens is focused on the screen with the shutter opened, by hand if necessary. Taking the control switch S in his hand, the operator then sets the "forward-reverse" switch to move the magazine in the desired direction. Assuming a slide to be in position and the shutter closed, the operator causes a picture to be projected on the screen by pressing shutter switch 42. If the shutter is set on "time" this will open the shutter which will stay open until the switch is pressed again. If the switch is set on "bulb" the shutter will remain open as long as the switch is pressed. If on any other setting, the shutter will stay open for the time determined by its mechanism.

To project the next slide, the operator then depresses the "slide change" switch 41. This produces a sequence of automatically controlled operations in which the flag F is raised into the light beam, the pressure frames are simultaneously opened, the slide changing mechanism moves outwardly to return the slide to the empty slot in the magazine, remains in that position momentarily while the indexing mechanism moves the magazine to the next slot, whereupon the slide changing mechanism takes the next slide and returns it to the projection position between the pressure frames, the pressure frames close and the flag drops and the projector is ready to exhibit the next slide. Assuming the shutter to be closed, this will take place as soon as the operator again presses the shutter switch 42. However, if the shutter is left open, by setting it on "time," one picture after another can be projected merely by pressing the "slide change" switch. Obviously this switching operation could be done mechanically and the projector rendered fully automatic and obviously, since the unit can be satisfactorily operated with the shutter continuously open, the shutter may be dispensed with. Between projections the flag blocks out the light and eliminates any flash of light or motion on the screen. If it is desired to return to any slide already projected this may be done by throwing the "forward-reverse" switch and reversing the sequence. With the shutter closed, any desired number of slides may be shifted until the one is reached which it is desired to project. A complete cycle of slide changing operations takes approximately one second.

While the foregoing mechanism has been fully described, in compliance with the patent statutes, it is to be understood that various modifications may be made in the details thereof without departing from the scope of the invention as defined in the appended claims.

What is claimed is:

1. In a slide projector in combination, a projection system including a light source and lens disposed on an axis, a slide magazine positioned for rotation in a vertical plane parallel to and to one side of said axis, said magazine being in the form of a drum having radially disposed slide-receiving slots, a shell enclosing the face of the drum toward said axis and its periphery and rotatably secured to said drum, means preventing withdrawal of the slides through the other face of the drum, said shell having a slot with which the slots in the drum may be aligned as it rotates, means for positioning a slide on said axis for projection, means for retaining said shell with its slot in alignment with said slide positioning means, and reciprocating slide transfer means including a pusher and a slider for moving a slide between its slot in said drum and said slide positioning means, said pusher being movable relative to said slider so that it may be moved out of the path of said magazine to permit insertion and removal of the magazine in the projector and thereafter returned to a position to engage a slide supported in a slot therein.

2. In a slide projector in combination, a projection system including a light source and lens disposed on an axis, a slide magazine positioned for rotation in a vertical plane parallel to and to one side of said axis, said magazine being in the form of a drum having radially disposed slots partially closed on the side remote from said axis at their inner ends, a shell enclosing the face of the drum toward said axis and its periphery and rotatably secured to said drum, said shell having a slot with which the slots in the drum may be aligned as it rotates, means for positioning a slide on said axis for projection, means for retaining said shell with its slot in alignment with the slide positioning means, and slide transfer means adapted to shift slides between said slide positioning means and the magazine comprising a cam, means for driving the cam, a pivoted arm actuated by the cam, means for pushing a slide from the magazine to the slide positioning means and back to the magazine, link means interconnecting said pushing means and said arm, and means slidably supporting said pushing means for movement in a plane passing through the slot in said shell and said slide positioning means.

3. In a slide projector, in combination, a magazine comprising a drum having a central bore and having radially extending slide receiving slots opening into the periphery of and at one side of the drum, a shell rotatably attached to said drum and enclosing the face of the drum into which said slots open and also enclosing its periphery, said shell having a slot adapted to be aligned, on rotation of said drum, with each of the slots therein, a magazine supporting and driving shaft having a hub adapted to be removably inserted in said bore, means preventing relative rotation of said hub and said drum, and means for preventing rotation of said shell when said drum is mounted on said hub.

4. The magazine of claim 3 wherein said drum is provided near its periphery with a spring-retracted pin, a cross-bar mounted in the end of said pin and extending outwardly at right angles on one side thereof adapted to engage the walls of the slot in said shell when turned in one direction and to lie wholly within the shell when turned in the opposite direction, said drum having a recess into which said cross-bar is drawn in each of said positions.

5. In a slide projector, in combination, pressure frames adapted for separation to receive a slide, a light intercepting flag, a solenoid having an armature linked with said flag and said frames to move the flag into light intercepting position and to separate the frames when said solenoid is energized, a magazine holding a plurality of slides, slide transporting means for shifting slides one at a time between the magazine and said frames, indexing means for moving the magazine between the delivery of a slide thereto and the taking of another slide therefrom by said transporting means, a motor, a shaft driven thereby, a transfer cam on said shaft in operative relationship to said transporting means to move it between its two extreme positions, an indexing cam also on said shaft adapted to produce movement of said indexing means, and a manual control switch for simultaneously starting said motor and energizing said solenoid.

6. In a slide projector, in combination, pressure frames adapted for separation to receive a slide, a light intercepting flag, a solenoid having an armature linked with said flag and said frames to move the flag into light intercepting position and to separate the frames when said solenoid is energized, a magazine holding a plurality of slides, silde transporting means for shifting slides one at a time between the magazine and said frames, indexing means for moving the magazine between the delivery of a slide thereto and the taking of another slide therefrom by said transporting means, a motor, a shaft driven thereby, a transfer cam on said shaft in operative relationship to said transporting means to move it between its two extreme positions, an indexing cam also on said shaft adapted to produce movement of said indexing means, a manual control switch for simultaneously starting said motor and energizing said solenoid, and a second switch in shunt with the manual switch adapted to be closed by the initial movement of parts driven by the motor and to be opened on completion of a single cycle of operations.

7. In a slide projector wherein a plurality of slides are radially arranged about the axis of rotation of a rotatable magazine, indexing means to advance the magazine step-by-step through the distance between two adjacent slides, said means comprising a shaft adapted to drive the magazine, a sprocket-like detent fixed on said shaft, a movable arm adapted to engage the depressions in said detent to prevent movement thereof, friction driving means rotatably mounted on said shaft in driving relation to said detent, means for continuously rotating said driving means during the period when magazine movement is required, a lever associated with said arm and movable therewith, and means acting on said lever at timed intervals to disengage the arm from the detent to permit the shaft to be rotated by said friction driving means.

8. In a slide projector wherein a plurality of slides are radially arranged about the axis of rotation of a rotatable magazine, indexing means to advance the magazine step-by-step through the distance between two adjacent slides, said means comprising a shaft adapted to drive the magazine, a sprocket-like detent fixed on said shaft, a movable arm adapted to engage the depressions in said detent, means resiliently urging said arm toward said detent, friction driving means rotatably mounted on said shaft in driving relation to said detent, means for rotating said driving means, a lever associated with said arm and movable therewith, and means acting on said lever at timed intervals to disengage the arm from the detent to permit the shaft to be rotated by said driving means.

9. In a slide projector, in combination: a pressure frame assembly for locating mounted transparencies in a given plane for projection comprising, a pair of separately pivoted plates, a pair of frame members, each frame member being pivotally connected to each of said plates, the spacings of the pivots of said plates and said frame members being such that said frame members form with said plates a parallel motion linkage, one of said plates having an outwardly extending arm; a pivoted light intercepting flag; a solenoid having an armature; linkage interconnecting said armature with said flag and with said arm; and switching means for energizing said solenoid to simultaneously move said flag to light intercepting position and separate said frame members.

10. In a slide projector wherein slides are moved from a magazine to projection position and returned to the magazine, slide transfer means comprising, a slider to engage one edge of a slide, track means therefor, a pusher attached to the slider and adapted to engage the opposite edge of a slide, a pivoted arm, means resiliently urging the arm in one direction, a cam adapted to move the arm in the opposite direction, a pivoted link connected to said slider, said arm and said link having interengaging stop members, a spring associated with said arm and said link and adapted to move said stop members toward one another and thereby to move the link in the same direction that the cam moves said arm, whereby said link and said slider can be moved in the opposite direction independently of said arm in opposition to the force exerted by said spring with separation of said stop members.

11. A control circuit for an electrically operated magazine-type slide projector containing an electric drive motor for the slide-changing and magazine indexing mechanism, comprising a manually operated double-pole single-throw snap switch, a latch relay having a latch coil and a release coil and a pair of normally open contacts and a pair of normally closed contacts controlled by said latch coil, a pair of normally closed switches mounted for actuation by a part of said mechanism and held open thereby at the completion of a cycle of operations, actuation of said manually operated switch supplying current to said motor, one of said normally closed switches acting on initial movement of the mechanism to shunt the manual switch and the other normally closed switch acting simultaneously to energize the latch coil whereupon its normally closed contacts open to disconnect the manual switch from the motor circuit and the normally open contacts close to connect the released position side of the manual switch with the release coil; whereby on completion of one cycle of operations and the opening of the two normally closed switches the latch coil and the motor are deenergized.

References Cited in the file of this patent

UNITED STATES PATENTS

| Number | Name | Date |
|---|---|---|
| 570,199 | Caplinger | Oct. 27, 1896 |
| 1,082,260 | Braun | Dec. 23, 1913 |
| 1,151,221 | Schwanhausser | Aug. 24, 1915 |
| 1,594,952 | Headding et al. | Aug. 3, 1926 |
| 1,605,245 | Lehmann | Nov. 2, 1926 |
| 1,761,604 | Webber | June 3, 1930 |
| 1,960,047 | Contal | Mar. 6, 1934 |
| 2,122,870 | Santoni | July 5, 1938 |
| 2,146,452 | Spindler | Feb. 7, 1939 |
| 2,221,753 | Bodie | Nov. 19, 1940 |
| 2,375,706 | Stechbart et al. | May 9, 1945 |
| 2,537,429 | Seyler | Jan. 9, 1951 |
| 2,583,442 | Parlini et al. | Jan. 22, 1952 |

FOREIGN PATENTS

| Number | Country | Date |
|---|---|---|
| 729,514 | Germany | Dec. 17, 1942 |